United States Patent [19]

Bilgrien et al.

[11] Patent Number: 5,364,922
[45] Date of Patent: Nov. 15, 1994

[54] CURABLE COMPOSITIONS CONTAINING AN ANAEROBICALLY INACTIVE HYDROSILATION CATALYST AND METHOD FOR PREPARING SAID COMPOSITIONS

[75] Inventors: Carl J. Bilgrien; Michael A. Lutz; Binh T. Nguyen, all of Midland, Mich.

[73] Assignee: Dow Corning Corporation, Midland, Mich.

[21] Appl. No.: 117,458

[22] Filed: Sep. 7, 1993

[51] Int. Cl.$^5$ .............................................. C08G 77/08
[52] U.S. Cl. ........................................ 528/15; 525/100; 525/105; 525/106; 528/12; 528/20; 528/23
[58] Field of Search ................... 528/15, 23, 12, 20; 525/100, 105, 106

[56] References Cited

U.S. PATENT DOCUMENTS

| | | |
|---|---|---|
| 3,188,300 | 6/1965 | Chalk . |
| 3,249,580 | 5/1966 | Beck . |
| 4,526,954 | 7/1988 | Williams . |
| 4,529,553 | 7/1985 | Faltynek ........................... 528/32 |
| 4,578,497 | 3/1986 | Onopchenko et al. . |

FOREIGN PATENT DOCUMENTS 511882 11/1992 European Pat. Off. .

OTHER PUBLICATIONS

Chemistry of Materials (1989, 1, 106–114) L. Lewis and N. Lewis.
J. Am. Chem. Soc. 112, 116, 5998 (1990) L. Lewis.
"Organometallics" vol. 9, pp. 621–625(1990) L. Lewis and R. Uriate.
"Organic Synthesis via Metal Carbonyls" I. Wondr and P. Pino, Eds. Wiley (N.Y.)1977 vo. 2, pp. 682–683.
Journal of the Chemical Soc., Dalton Trans., vol. 2, (1980) pp. 308–313.

*Primary Examiner*—Melvyn I. Marquis
*Attorney, Agent, or Firm*—Robert Spector

[57] ABSTRACT

The present invention utilizes a class of novel hydrosilation catalysts that are inhibited in the absence of molecular oxygen to prepare storage stable, one part curable compositions containing (1) compounds with alkenyl radicals and (2) compounds with silicon-bonded hydrogen atoms. The compositions are stable until exposed to molecular oxygen, at which time they cure in the same manner as conventional compositions containing these ingredients.

37 Claims, No Drawings

CURABLE COMPOSITIONS CONTAINING AN ANAEROBICALLY INACTIVE HYDROSILATION CATALYST AND METHOD FOR PREPARING SAID COMPOSITIONS

BACKGROUND OF THE INVENTION

1. Field of the Invention

This invention relates to curable compositions that can be stored for extended periods of time in the absence of molecular oxygen and contain a platinum-group metal based hydrosilation catalyst that is at least partially inhibited under anaerobic conditions. Curing of the compositions is achieved by exposing them to molecular oxygen, which activates the catalyst and initiates curing of the composition under ambient conditions or with heating.

2. Background Information

Curable compositions containing polyorganosiloxanes or organosiloxane-modified organic polymers yield crosslinked products ranging from flowable gels to elastomers to resins and find use in a wide variety of applications. These compositions can be classified based on the reaction used to cure the compositions and the conditions required to cure the compositions. One class of compositions cure by a hydrosilation reaction that is catalyzed by a metal from the platinum group of the periodic table or a compound of such a metal. These metals include platinum, rhodium and palladium.

The advantages of curing using a hydrosilation reaction include not requiring the presence of moisture or excessively high temperatures to initiate the curing reaction. The curing reaction occurs when all of the reactants, namely an organic polymer or polyorganosiloxane containing at least two alkenyl radicals per molecule and a compound containing at least two silicon bonded hydrogen atoms per molecule, are combined with the hydrosilation catalyst under ambient conditions. The obvious disadvantage of this type of curable composition is its poor storage stability. If it is not convenient to prepare the composition just prior to use, one method for overcoming this disadvantage is to prepare a two part composition by packaging the hydrosilation catalyst and the compound containing the silicon-bonded hydrogen atoms in separate containers.

One-part curable compositions with storage stabilities ranging from days to months depending upon the temperature can be prepared using known platinum catalyst inhibitors such as acetylenic compounds and amines or by encapsulating the hydrosilation catalyst in a material that is melted or fragmented to release the catalyst when it is desired to cure the composition. Both of these methods have disadvantages associated with them, including increased cost, relative high curing temperature and/or extended curing times.

The effect of anaerobic conditions, i.e. the absence of molecular oxygen, on the platinum-catalyzed reaction between organohydrogensilanes and alkenes or non-polymeric organosilicon compounds containing ethylenic unsaturation is reported in the patent and journal literature. U.S. Pat. No. 4,578,497, which issued to Onpochenko and Sabourin on Mar. 25, 1986 reports that oxygen enhanced the rate of the platinum catalyzed hydrosilation of 1-alkenes with mono-, di- and trialkylsilanes to yield the corresponding tetraalkylsilanes. Examples of the types of platinum catalysts exhibiting this effect include a platinum catalyst having the basicity substantially equal to or less than that provided by a platinum-containing catalyst having a triphenylphosphine ligand or a heterogeneous platinum-containing catalyst. Specific catalysts exhibiting enhanced activity in the presence of oxygen included chloroplatinic acid, the Wilkinson catalyst [RhCi(PPh$_3$)$_3$], and carbon-supported platinum metal catalysts.

L. Lewis and N. Lewis in the journal Chemistry of Materials (1989, 1, 106-14) report that the reaction between platinic chloride and dimethylethoxysilane does not occur in the absence of molecular oxygen.

An article by L. Lewis [J. Am. Chem. Soc., 112, 16, 5998 (1990)] reports that formation of a catalytically active colloid by the reaction of a platinum compound with a stoichiometric excess of a silane or disiloxane containing silicon-bonded hydrogen atoms did not occur in the absence of molecular oxygen. The author considers the colloid to be the initiating species for hydrosilation reactions. Other hydrosilation reactions using this type of colloidal catalyst prepared using platinum and rhodium compounds are described by L. Lewis and R. Uriate in the journal "Organometallics" Vol. 9, pages 621-625 (1990).

An article by J. F. Harod and A. J. Chalk in a text entitled "Organic Synthesis via Metal Carbonyls" (I. Wender and P. Pino, Eds., Wiley (New York), 1977, Vol. 2, pp. 682-683) reports that complexes of the type [(olefin)PtCl$_2$]$_2$ prepared under anaerobic conditions are totally inactive as hydrosilation catalysts with triethoxysilane, even though addition of the triethoxysilane resulted in decolorization of the initially yellow platinum/olefin complex. Catalytic activity was restored when the olefin complex was exposed to oxygen, even when the hydrosilation reaction was carried out under anaerobic conditions. The anaerobic inhibition was not observed using trichlorosilane and triethylsilane.

Rate reductions under anaerobic conditions of hydrosilation reactions involving various silanes containing silicon bonded hydrogen atoms with various olefins and vinylsilanes using rhodium and iridium catalysts, including rhodium/phosphine complexes, relative to the rate of the identical reactions in air are reported by H. Dickers et al. in the Journal of the Chemical Society, Dalton Transactions, Vol. 2, (1980) pp. 308-313.

These studies on the effect of molecular oxygen on hydrosilation reactions catalyzed by platinum group metals and compounds of these metals used conventional platinum group metal hydrosilation catalysts. The reactants in the hydrosilation reaction did not include polyorganosiloxanes capable of forming gels, elastomers, resins and similar high molecular weight crosslinked materials.

Organosiloxane compositions that cure upon heating by a platinum-catalyzed hydrosilation reaction and contain a "conventional" platinum catalyst and a phosphine or phosphite as the platinum catalyst inhibitor are claimed in U.S. Pat. No. 3,188,300 that issued to Chalk on Jun. 8, 1965. Organosiloxane compositions containing these compounds are alleged to be stable for periods up to 24 hours "or longer" at 25° C. There is no teaching in this patent concerning the effect of or any advantage associated with preparing and storing the ingredients of the curable composition and the composition itself in the absence of oxygen.

Organosiloxane compositions that are stable in the absence of molecular oxygen but cure to yield elastomers or other useful materials in the presence of oxygen by a variety of reactions are known in the art. For example, U.S Pat. No. 3,249,580, which issued to Beck on May 3, 1966 describes anaerobically stable compositions containing copolymers prepared by reacting a halogen-terminated polysilane containing at least two silicon-bonded hydrogen atoms per molecule with a member of a class of silanol-containing organosilicon compounds that includes polyorganosiloxanes.

U.S. Pat. No. 4,526,954, which issued to Williams on Jul. 2, 1988 describes linear and cyclic organosiloxane polymers that cure in the presence of oxygen but are stable under anaerobic conditions. The polymers are characterized by the presence of at least one 1,3-pentadienyl or 1,4-pentadienyl radical per molecule. The group containing this radical is bonded to silicon through a silicon-carbon bond. This patent also describes curable compositions containing the novel polymers in addition to fillers and curing catalysts.

Published European Patent Application No. 511,882-A1, published on Nov. 4, 1992, describes polyorganosiloxanes containing cyclopentadiene or cyclopentadienyl groups bonded to silicon directly or through a hydrocarbylene radical. The polyorganosiloxanes cure in the presence of moisture or oxygen.

One objective of this invention is to provide anaerobically inhibited compositions that cure in the presence of molecular oxygen to yield elastomers, foams, resins and other useful crosslinked materials. A second objective is to provide a method for preparing these curable compositions using novel hydrosilation catalysts that are at least partially inactivated in the absence of oxygen.

SUMMARY OF THE INVENTION

The present invention utilizes hydrosilation catalysts that are at least partially inactivated in the absence of oxygen to prepare storage stable, one- and multi-part curable compositions containing (1) at least one compound with an average of at least two alkenyl radicals per molecule and (2) at least one compound with an average of at least two silicon-bonded hydrogen atoms. The catalysts are inactivated by reaction with a specified group of organosilicon compounds containing silicon-bonded hydrogen atoms. Curing of the compositions containing the inactivated catalysts is at least partially inhibited until the compositions are exposed to molecular oxygen, at which time they cure in the same manner as conventional compositions containing these ingredients.

DETAILED DESCRIPTION OF THE INVENTION

This invention provides curable compositions exhibiting cure inhibition in the absence of oxygen, said composition comprising
   A. a first compound containing at least two ethylenically unsaturated or acetylenically unsaturated groups per molecule;
   B. an amount sufficient to cure said composition in the presence of an active hydrosilation catalyst of a second compound containing at least two silicon-bonded hydrogen atoms per molecule; and
   C. an amount sufficient to promote curing of said composition in the presence of oxygen of an anaerobically inhibited hydrosilation catalyst containing a platinum group metal.

One class of anaerobically inhibited hydrosilation catalysts suitable for use in the present compositions are reaction products of (1) an anaerobically active hydrosilation catalyst selected from the group consisting of platinum group metals and compounds thereof and (2) at least one organosilicon compound containing at least one silicon-bonded hydrogen atom per molecule. Preferred organosilicon compounds contain from one up to three or more silicon-bonded hydrogen atoms per molecule, and include organosilanes, polysilanes and polyorganosiloxanes. The substituents other that hydrogen atoms bonded to the silicon atoms of said organosilicon compounds are selected from the group consisting of monovalent hydrocarbon radicals, alkoxy groups and siloxane units.

When the anaerobically active catalyst is a platinum group metal or a compound containing a platinum group metal, particularly platinum in the zero valence state, certain restrictions appear to apply when none of the silicon atoms of the organosilicon compound contain more than one hydrogen atom. In this instance the silicon atoms bonded to hydrogen must also be bonded to two or three oxygen atoms. If the silicon atom is bonded to two oxygen atoms, at least one of the oxygen atoms must be part of a hydrocarbyloxy group. The remaining valence can be satisfied by a monovalent hydrocarbon radical.

So long as the restrictions regarding zero valent platinum group metals are observed, the substituents other than hydrogen atoms bonded to the silicon atoms of organosilicon compounds that can be reacted with the anaerobically active platinum group metal-containing hydrosilation catalysts include but are not necessarily limited to monovalent hydrocarbon radicals and organosilylalkyl ($-R^*Si\equiv$), organosiloxy ($OSi\equiv$), and/or alkoxy groups, where $R^*$ represents an alkylene radical.

This invention also provides a method for preparing and storing compositions that cure in the presence of molecular oxygen and exhibit at least partial cure inhibition in the absence of oxygen, said method comprising the sequential steps of
   1) blending in the absence of oxygen
      A. a first compound containing at least two ethylenically or acetylenically unsaturated groups per molecule;
      B. an amount sufficient to cure said composition in the presence of an active hydrosilation catalyst of a second compound containing at least two silicon-bonded hydrogen atoms per molecule; and
      C. an amount sufficient to promote curing of said composition in the presence of molecular oxygen of an anaerobically inhibited hydrosilation catalyst; and
   2) storing the resultant composition in the absence of molecular oxygen.

As used in this specification, molecular oxygen refers to the gaseous or liquefied form of oxygen, which can be present alone or as an ingredient in a mixture of gases such as air.

The term "absence of molecular oxygen" refers to environments containing less than about 1 part per million of molecular oxygen. The present inventors have discovered that the long term storage stability characteristic of the present curable compositions gradually decreases in proportion to the concentration of molecular oxygen. Methods and devices for isolating compositions from trace amounts of oxygen are known in the art. One such method comprises preparing compositions in an oxygen-free environment and packaging them in hermetically sealed containers.

The maximum concentration of oxygen that can be present without substantially decreasing the storage stability of the present compositions is determined by a number of variables, including but not limited to reactivity of the curable ingredients and the particular catalyst selected, and the method of packaging the composition. The catalyst can be packaged separately from the unsaturated reactants and/or the compounds containing silicon-bonded hydrogen atoms during storage to increase the storage stability of the composition.

The Anaerobically Inactive Catalyst

The characterizing feature of the present compositions is their storage stability under anaerobic conditions, i.e. in the absence of molecular oxygen. This feature is due to inhibition of an anaerobically active hydrosilation catalyst, which includes metals from the platinum group of the periodic table and compounds of these metals.

A preferred method for inhibiting the hydrosilation catalyst is by reacting it under anaerobic conditions with an organosilicon compound containing at least one silicon-bonded hydrogen atom per molecule.

The concentration of organosilicon compound is sufficient to inhibit the activity of the catalyst in the presence of oxygen.

When the anaerobically active catalyst contains a platinum group metal in the zero valent state and the organosilicon compound contains a maximum of one hydrogen bonded to any silicon atom, the silicon atoms bonded to hydrogen are also bonded to three siloxy or hydrocarbyloxy groups, or to two oxygen atoms, at least one of which is part of a hydrocarbyloxy group.

The Catalyst-Deactivating Organosilicon Compound

Preferred organosilicon compounds for reacting with anaerobically active catalysts to form the catalysts of the present compositions are organohydrogensilanes, organohydrogendisiloxanes and organohydrogenpolysiloxanes. The silanes and disiloxanes can be represented by formulae I and II

  (I)

  (II)

When the organosilicon compound is an organohydrogenpolysiloxane, the siloxane units containing silicon-bonded hydrogen atoms can be bonded to one, two or three siloxane units. These hydrogen-containing siloxane units can be represented by formula III

  (III)

In these formulae $R^1$ is a monovalent hydrocarbon radical that is free of ethylenic or acetylenic unsaturation, $R^2$ is alkyl containing from 1 to 4 carbon atoms, a is 1, 2 or 3; b is 0, 1, 2 or 3; and the sum of a and b does not exceed 4; c is 1, 2 or 3; and d and e are each 0, 1 or 2, with the proviso that the sum of c, d, and e is 1, 2 or 3.

When more than one $R^1$ and/or $R^2$ substituents are present these can be identical or different. The hydrocarbon radicals represented by $R^1$ typically include alkyl, cycloalkyl, aryl, aralkyl and alkaryl radicals. These hydrocarbon radicals are preferably alkyl containing from 1 to 4 carbon atoms, phenyl and/or 3,3,3-trifluoropropyl and $R^2$ is preferably methyl or ethyl.

When the platinum group metal present in the anaerobically active catalyst is in the zero valence state, such as in the metal itself or in certain complexes of platinum halides with disiloxanes containing ethylenically unsaturated hydrocarbon radicals such as vinyl bonded to silicon, certain restrictions apply to the catalyst deactivating organosilicon compound. These restrictions are described in a preceding section of this specification. The hydrogen-substituted silicon atoms of preferred members of this restricted class of organosilicon compounds containing no more than one hydrogen on any silicon atom can be represented by the formula

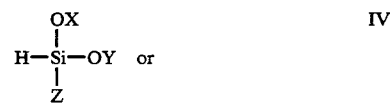  IV

  V where X and Y are individually selected from alkyl and $SiR^4_3$, Z is alkyl, alkoxy or $OSiR^4_3$, $R^3$ is alkyl and each $R^4$ is individually selected from the group consisting of hydrogen atoms, unsubstituted and substituted hydrocarbon radicals, alkoxy groups and organosiloxane groups, with the proviso that when Z is alkyl, X and Y cannot both be $SIR^4_3$. Formula IV encompasses silanes and siloxanes. It will be understood that the three $R^4$ substituents include but are not limited to hydrogen atoms, unsubstituted and substituted hydrocarbon radicals, alkoxy groups, and organosiloxane groups.

Specific compounds suitable for use with catalysts containing monovalent platinum include but are not limited to alkylsilanes such as n-hexylsilane, diethylsilane and triethylsilane, and silanes containing both alkyl radicals and alkoxy groups, such as methyldimethoxysilane.

If the platinum group metal present in the anaerobically active hydrosilation catalyst is not in the zero valence state the catalyst can be converted to an anaerobically inhibited one by reaction with organosilicon compounds corresponding to formula I or II or with any other organosilicon compound containing at least one silicon atom bonded to at least one hydrogen atom.

Preferred silanes that can be used to prepare anaerobically inhibited catalysts from anaerobically active platinum compounds include but are not limited to alkylhydrogensilanes such as methylsilane, n-hexylsilane, diethylsilane, triethylsilane, methylphenylsilane, methyldimethoxysilane, trimethoxysilane, and triethoxysilane.

The Anaerobically Active Catalyst

The anaerobically active platinum catalysts used to prepare the catalyst ingredient of the present compositions can be any of the platinum group metals and compounds of these metals reported in the literature as capable of catalyzing a hydrosilation reaction between alkenyl or alkynyl radicals and silicon-bonded hydrogen atoms.

Useful anaerobically active catalysts include but are not limited to platinum, palladium and rhodium and compounds of these metals, particularly the halides and compounds wherein at least a portion of the halogen atoms have been replaced with other atoms such as hydrogen and/or complexes with ethylenically unsaturated organic or organosilicon compounds.

Preferred anaerobically active hydrosilation catalysts include but are not limited to platinum halides, particularly the dichloride, tetrachloride and chloroplatinic acid, and complexes obtained by reacting platinum halides, particularly the tetrachloride and chloroplatinic acid, with olefins, silanes or disiloxanes containing at least one terminally unsaturated alkenyl or alkynyl radical per molecule.

When the anaerobically active catalyst is a complex derived from a platinum group metal compound and an ethylenically unsaturated organic or organosilicon compound containing at least one alkenyl radical, the alkenyl radicals contain from two up to about eight carbon atoms when the unsaturated compound is an organosilicon compound. Preferred alkenyl radicals are vinyl, allyl and 5-hexenyl.

Suitable ethylenically unsaturated organosilicon compounds include but are not limited to vinyl-containing silanes, tetraalkyldivinyldisiloxanes, and linear or cyclic organosiloxane oligomers containing up to about 12 siloxane units and at least one alkenyl radical per molecule.

Useful complexes derived from alkenyl-substituted organosilicon compounds and platinum group metal compounds are described in U.S. Pat. Nos. 3,775,452 and 3,715,334 to Karstadt, and U.S. Pat. Nos. 3,159,601 and 4,288,345 to Ashley. The relevant portions of these patents are incorporated herein by reference.

Particularly preferred coordination complexes are reaction products of halogen-containing platinum compounds such as platinum (II) chloride and chloroplatinic acid and terminally unsaturated hydrocarbons, alkenyl-substituted silanes and symtetraalkyldivinyldisiloxanes. Complexes derived from disiloxanes and chloroplatinic acid are described in U.S. Pat. No. 3,419,593 to Willing et al., the pertinent portions of which are hereby incorporated by reference thereto.

Preferred olefins for preparing complexes with platinum group metals and compounds of these metals contain from 6 to 10 carbon atoms, are terminally unsaturated and include but are not limited to liquid hydrocarbons such as 1-hexene and 1,5-hexadiene.

Preparation of the Anaerobically Inactive Catalyst

The present catalysts are prepared by reacting the anaerobically active catalyst with at least one of the catalyst deactivating organosilicon compounds. The catalysts are prepared, isolated and stored under anaerobic conditions.

Typically the organosilicon compound is added to the anaerobically active catalyst in the absence of molecular oxygen. The molar ratio of organosilicon compound to catalyst is greater than 1, and is preferably at least 50. It should be understood that if the catalyst contains ethylenically or acetylenically unsaturated compounds, the quantity of silicon-bonded hydrogen added should be sufficient to react with all of the unsaturated carbon atoms.

The reaction between the catalyst and the organosilicon compound may be exothermic, and it may therefore be necessary to cool the reaction mixture to prevent decomposition of the anaerobically inactive catalyst.

To verify that the catalyst is and will remain inhibited under anaerobic conditions an excess of the SiH-containing organosilicon compound present during preparation of the catalyst together with an ethylenically unsaturated organic or organosilicon compound are added until both compounds are present in unreacted form, indicating that the catalyst has been rendered inactive.

If the anaerobically active catalyst does not contain zero valent platinum, an anaerobically inactive catalyst can be prepared by reacting the anaerobically active catalyst, such as hexachloroplatinic acid, with the organohydrogenpolysiloxane used as the curing agent for the curable organosiloxane composition. So long as the reaction between the anaerobically active catalyst and the organohydrogenpolysiloxane is conducted under anaerobic conditions, other reactive ingredients of the curable composition, including the ethylenically or acetylenically unsaturated compound, can be present in the reaction mixture without causing the composition to cure.

The catalyst compositions used to prepare the anaerobically stable organosiloxane compositions of this invention typically contain from 0.01 to 1 weight percent or more of the platinum-group metal.

The concentration of the present anaerobically inhibited catalysts in the curable compositions of this invention is typically from 10 to 125 parts per weight of the platinum group metal per million parts by weight of the curable composition.

In addition to the curable reactants, anaerobically inhibited catalyst and the optional catalyst inhibitors and oxygen scavengers described in a subsequent portion of this specification, the curable compositions of this invention may contain the optional ingredients such as fillers and property-enhancing additives typically present in compositions that cure by a platinum group metal catalyzed reaction between silicon-bonded hydrogen atoms and ethylenically or acetylenically unsaturated groups.

Examples of curable reactants include but are not limited to (1) ethylenically or acetylenically unsaturated organic compounds, including monomers and oligomers, and unsaturated organosilicon compounds, and (2) organohydrogensilanes. The compositions can contain one or more species of each type of reactant. These ingredients will now be discussed in detail.

The Ethylenically or Acetylenically Unsaturated Compound (Reactant A)

The curable compound containing at least two ethylenically or acetylenically unsaturated groups, also referred to as reactant A, includes both organic and organosilicon compounds. Depending upon the nature of the final cured product, this compound can be a monomer, oligomer or polymer. Cured products that can be prepared using the present compositions range in consistency from gels to elastomers to resins.

As used in this specification the term "ethylenically unsaturated group" includes alkenyl radicals such as vinyl, allyl and 1,3-butadienyl in addition to groups containing a carbon-to-carbon double bond and hetero atoms such as oxygen and nitrogen. The latter groups include but are not limited to acryloxy, —O-(O)CCH=CH$_2$, and acrylamido, —HN(O)CCH=CH$_2$. The only restriction is that the groups do not interfere with storage or curing of the curable composition.

The term "acetylenically unsaturated group" includes both hydrocarbon radicals such as ethynyl, —C≡C— and substituted hydrocarbon radicals such as propargyl, —O(O)CC≡CH.

The reactive groups present on reactant A are preferably alkenyl radicals containing from 2 to 20 carbon atoms.

When reactant A contains the preferred alkenyl radicals as the ethylenically unsaturated group and is a polyorganosiloxane, this reactant can be a liquid or pumpable material exhibiting a viscosity of from 0.1 to about 1000 Pa.s at 25° C., or a high consistency gum that is characterized in terms of Williams plasticity values.

When reactant A is a polyorganosiloxane, the alkenyl radicals are typically vinyl, allyl, or 5-hexenyl. Vinyl and 5-hexenyl are preferred, based on the cost of the corresponding intermediates and the reactivity of the polyorganosiloxanes containing these radicals.

The organic groups other than alkenyl radicals that are bonded to the silicon atoms of polyorganosiloxanes used as reactant A and the organohydrogensiloxanes used as curing agents for the present compositions are monovalent hydrocarbon radicals that are free of ethylenic or acetylenic unsaturation. These hydrocarbon radicals can be unsubstituted or can contain one or more substituents that will not interfere with curing of the present compositions. Suitable substituents include but are not limited to halogen atoms such as chlorine, bromine and fluorine. Substituents such as epoxide groups can be present to modify properties such as adhesion of the cured products prepared using the present compositions.

Preferred hydrocarbon radicals include alkyl radicals containing from one to about four carbon atoms, haloalkyl radicals such as chloromethyl and 3,3,3-trifluoropropyl and aromatic radicals such as phenyl and tolyl.

Most preferably at least 50 percent of the hydrocarbon radicals present on the alkenyl-substituted polyorganosiloxane(s) and the organohydrogensiloxanes present in the curable organosiloxane compositions of the present invention are methyl, and any remainder are phenyl and/or 3,3,3-trifluoropropyl, this preference being based on the availability of the reactants typically used to prepare the polyorganosiloxanes and the properties of cured elastomers and other materials prepared from these polyorganosiloxanes.

Representative embodiments of preferred alkenyl-substituted polyorganosiloxanes containing vinyl radicals only at the terminal positions include but are not limited to dimethylvinyl siloxy-terminated polydimethyl siloxanes, dimethylvinylsiloxy-terminated polymethyl-3,3,3trifluoropropylsiloxanes, dimethylvinylsiloxy-terminated dimethylsiloxane/3,3,3-trifluoropropylmethylsiloxane copolymers and dimethylvinylsiloxy-terminated-dimethylsiloxane/methylphenylsiloxane copolymers. The vinyl radicals of these preferred polyorganosiloxanes can be replaced with other alkenyl radicals such as 5-hexenyl.

Copolymers containing dimethylsiloxane, dimethylvinyl siloxane, methylsilsesquioxane and trimethylsiloxy units are also particularly suitable as the alkenyl-substituted polyorganosiloxane ingredient.

The present curable compositions can contain a single species of polyorganosiloxanes corresponding to the preferred embodiments of reactant A. Alternatively two or more of these polyorganosiloxanes can be present. The polyorganosiloxanes differ with respect to their molecular weight and/or the number of silicon-bonded alkenyl radicals per molecule.

Organic compounds containing at least two unreacted ethylenically or acetylenically unsaturated groups per molecule are also suitable for use as reactant A. These compounds can be liquid or solid at room temperature and include but are not limited to monomers such as butadiene, diacrylates derived from polyfunctional alcohols, polyolefins such as polyethylene, polypropylene and copolymers of styrene with other ethylenically unsaturated compounds such as acrylonitrile and butadiene; and polymers derived from functionally substituted organic compounds such as esters of acrylic, methacrylic and maleic acids.

The organic compounds, oligomers and polymers can be used alone or in combination with polyorganosiloxanes corresponding to the definition of reactant A.

The Curing Agent (Reactant B)

Compositions containing one or more compounds corresponding to the definition of reactant A are cured by reaction with a compound containing at least two silicon-bonded hydrogen atoms per molecule. The SiH-containing compounds can be organic oligomers, organic polymers, silanes containing at least two silicon-bonded hydrogen atoms per molecule or organohydrogensiloxanes. The organic groups bonded to the silicon atoms of the curing agent are monovalent hydrocarbon radicals that are either unsubstituted or contain substituents such as halogen atoms that will not adversely affect the storage stability or curing of the present compositions. These SiH-containing compounds are well known in the art, and are free of ethylenic or acetylenic unsaturation.

In preferred curable compositions of this invention one or more polydiorganosiloxanes containing an average of at least two alkenyl radicals groups per molecule react with a relatively low molecular weight, liquid organic polymer or organohydrogensiloxane containing an average of at least two silicon bonded hydrogen atoms per molecule. To obtain crosslinked materials the sum of the average numbers of alkenyl radicals and silicon-bonded hydrogen atoms per molecule of the respective reactants is greater than 4.

Suitable organohydrogensiloxanes contain from as few as four silicon atoms per molecule up to an average of 20 or more, and preferably exhibits a viscosity of up to 10 Pa.s at 25 degrees C. These organohydrogensiloxanes contain repeating units of the formulae $HSiO_{1.5}$, $R^5HSiO$ and/or $R^5_2HSiO_{0.5}$. The molecules of this reactant may also include one or more monoorganosiloxane, diorganosiloxane, triorganosiloxy and $SiO_{4/2}$ units that do not contain silicon bonded hydrogen atoms. In these formulae each $R^5$ is a monovalent hydrocarbon radical as defined in the preceding section of this specification.

Alternatively, reactant B can be a cyclic compound containing at least 4 organohydrogensiloxane units of the formula $R^5HSiO$, or a compound of the formula $HR^5_2SiO(HR^5SiO)_aSiR^5_2H$, where a is at least 1.

Most preferably $R^5$ is methyl and reactant B is a linear trimethylsiloxy terminated polymethylhydrogensiloxane or a dimethylsiloxane/methylhydrogensiloxane copolymer containing an average of from 5 to about 50 repeating units per molecule of which from 30 to 100 percent are methylhydrogensiloxane units.

In addition to hydrocarbon radicals and reactive groups required for curing of the composition, reactants A and B can contain other substituents such as alkoxy and epoxy groups that provide adhesion or other useful properties to the cured materials prepared using the present compositions but do not interfere with storage and/or curing of the compositions.

The molecular weights of reactants A and B together with the number and distribution of the silicon-bonded hydrogen atoms and alkenyl radicals groups within these ingredients will determine the location of crosslinks in the cured product, which can range in consistency from a glass-like resin to an elastomer to a gel.

The concentration of crosslinks per unit volume is often referred to as the "crosslink density" and determines certain physical properties of the cured elastomer, particularly hardness, tensile strength and elongation. The particular combination of reactants A and B that will provide the desired combination of physical properties can readily be determined by routine experimentation with a knowledge of this invention.

The molar ratio of silicon bonded hydrogen atoms in reactant B to the alkenyl radicals in reactant A is a major factor in determining the properties of the elastomer or other cured material obtained from the composition. Because of the difficulty often experienced in achieving a complete reaction between all of the silicon bonded hydrogen atoms and all of the alkenyl radicals present in the reaction mixture, it is desirable to have a stoichiometric excess of one of these species in a curable composition. Depending upon the types of reactants, a molar ratio of from 0.3 to 5 silicon bonded hydrogen atoms per alkenyl radical will yield useful products. For the compositions exemplified in this application this ratio is preferably from 0.5 to 1.5. The preferred ratio for a given composition will be determined at least in part by the average molecular weight of reactants A and B, and the physical properties of the final cured product.

Optional Ingredients

The storage stability in tile absence of oxygen of the curable organosiloxane compositions containing anaerobically inhibited catalyst compositions can be substantially increased by the addition of conventional aerobic platinum catalyst inhibitors. These inhibitors are well known in the art and include but are not limited to actylenic hydrocarbons, such as 1-propyne and 1-butyne, acetylenic alcohols such as 2-methyl-3-butyn-2-ol and 1-ethynyl-1-cyclohexanol, tertiary amines such as tripropylamine and N,N,N',N'-tetramethylethylenediamine and esters of maleic and fumaric acids. The molar ratio of inhibitor to platinum group metal present in the catalyst is typically from 0.5 to about 500 and will depend on the particular inhibitor selected and the desired storage stability and cure time in the presence of oxygen.

The inhibitor is preferably added to the catalyst prior to adding the catalyst to the other ingredients of the present compositions.

In addition to increasing the storage stability of the organosiloxane compositions, including the present anaerobically stable compositions, many conventional inhibitors for platinum group metal-containing hydrosilation catalysts also increase the curing time of the compositions. This increase in cure time can be reduced by using an inhibitor whose activity is suppressed in the presence of molecular oxygen. These inhibitors include organophosphorus compounds that include but are not necessarily limited to the di- and trihydrocarbylphosphines, di- and trihydrocarbylphosphine oxides, di- and trialkylphosphites, phosphinites, phospholene oxides and bis(dihydrocarbylphosphino)alkanes. Amine oxides and sulfoxides also have greater inhibiting activity under anaerobic conditions than in the presence of molecular oxygen, but apparently not to the same degree as the preferred organophosphorus compounds.

As in the case of conventional catalyst inhibitors, the concentration of oxygen-deactivated inhibitor relative to hydrosilation catalyst required to extend the storage life of a curable composition of the present invention will be determined by a number of factors, including but not limited to the activity of the inhibitor and the curing catalyst, the reactivity of reactants A and B the desired storage stability of the curable composition in the absence of oxygen and the working time of the composition in the presence of oxygen. It appears that the molar ratio of inhibitor to platinum group metal present in the curing catalyst is generally within the range of from 2 to about 200.

For the most effective oxygen deactivated catalyst inhibitors, such as the triorganophosphines and trialkylphosphine oxides, the molar ratio of inhibitor to platinum group metal is from 2 to about 20. Both the storage stability of the present compositions under anaerobic conditions and their cure rate in the presence of oxygen appears directly proportional to the concentration of oxygen deactivated catalyst inhibitor.

Compositions containing triorganophosphines, phosphites or phosphinites as inhibitors typically require relatively long time periods to cure at temperatures of from 20° to about 30° C. The curing times of these compositions can be reduced from weeks or months at 25° C. to days or hours by curing them at temperatures above about 80° C.

The storage stability of the present compositions under anaerobic conditions can be further increased by the presence in the curable composition of any of the known oxygen scavengers. Suitable scavengers include but are not limited to carbohydrazide ($H_2NNHC(O)NHNH_2$), aldehydes, amino acids, hydroquinones, active ferrous oxide, organosilicon polyboranes, trialkylboranes, phenylbutenones, hydroxycarboxylic acids such as ascorbic acid, ethylenically unsaturated carboxylic acids such as linoleic acid and potassium hydroquinone sulfonate. The reaction rate of the oxygen scavenger with molecular oxygen can be accelerated by use of a suitable catalyst, such as oxidizable salts of divalent cobalt, copper and manganese.

The concentration of these oxygen scavengers is selected to provide the desired storage stability and cure characteristics, and is typically from about 50 to about 10,000 moles per mole of platinum present in the inhibited catalyst.

In addition to the aforementioned ingredients the compositions can contain other additives including but not limited to reinforcing and non-reinforcing fillers, treating agents for these fillers, pigments, processing aids, adhesion promoters, stabilizers and flame retardants.

Preparation of Curable

The anaerobically inhibited compositions of this invention are prepared by blending reactant A with reactant B, the anaerobically inhibited catalyst and any other optional ingredients under anaerobic conditions. All of the reactants and other additives should be substantially free of molecular oxygen at the time they are combined with the other ingredients of the present curable compositions. Method for achieving this are described in the preceding section of this specification relating to preparation of the anaerobically inhibited catalysts.

Preferred methods for preparing anaerobically inhibited curable compositions are described in the accompanying examples. It will be understood that any of the known methods for excluding or removing oxygen from an environment can be used to generate the anaerobic conditions under which the present compositions are prepared and stored. These methods include but are not limited to use of hermetically sealed rigid and flexible containers and storing the compositions in the presence of oxygen-free inert gases and/or oxygen scavengers.

To avoid premature curing of anaerobically stable curable compositions containing the present catalysts, all of the reactions used to prepare the catalysts should be conducted in the substantial absence of molecular oxygen. Known methods for removing oxygen from reactants and reaction vessels include sparging with nitrogen or other inert oxygen-free gas, use of oxygen scavengers, and subjecting reactants to reduced pressure, which can be accompanied by freezing and thawing of the material and back-filling of the container with nitrogen or other inert gas. Under preferred conditions for preparing the present compositions the concentration of oxygen is preferably less than 1 part of oxygen per million parts of nitrogen or other, inert gases that constitute the atmosphere under which the compositions are prepared.

In accordance with a preferred method for preparing the present compositions, all ingredients are sparged with an inert oxygen-free gas such as nitrogen or argon and stored under this atmosphere until transferred to the reactor in which the composition will be prepared.

The consistency of the present curable compositions can range from pourable liquids to pastes that flow only under pressure to gum rubber stocks.

Cured materials prepared using the present compositions are useful in the same applications as materials prepared by hydrosilation reactions using conventional platinum catalysts. These uses include but are not limited to elastomers, resins, gels for protecting various substrates, and coatings for paper, electronic circuit boards and other substrates.

When packaged in a single container in the absence of oxygen the present compositions can be stored at 25° C. for periods ranging from days to months, depending upon the types of reactants, catalyst and other additives, such as catalyst inhibitors, present in the composition.

Compositions with virtually unlimited storage stability can be obtained by packaging the present compositions in at least two parts, with the catalyst in one container and reactant A and/or reactant B in a second container. When the ingredients are combined and stored under anaerobic conditions the compositions will have working times of from several hours to several months under ambient conditions. In the presence of oxygen the curing times are often considerably shorter relative to compositions containing conventional platinum catalyst inhibitors.

Curing of the Present Compositions

The present compositions cure in the presence of oxygen. Methods for curing the compositions include but are not limited to exposing the compositions to air, a stream of oxygen gas, and generating oxygen within the compositions such as by blending the composition with organic peroxides and subsequently heating the composition to decompose the peroxide. Peroxides that are stable under the conditions used to store the curable compositions can be included as an ingredient of these compositions.

The cure rate of the compositions can be controlled by regulating the amount of oxygen to which the composition is exposed in a given period of time. Curing can be accelerated by adding oxygen to the curable composition by sparging and/or heating the composition.

The following examples describe preferred methods for preparing anaerobically inhibited platinum-containing hydrosilation catalysts and storage stable compositions of the present invention containing these catalysts. The examples should not be interpreted as limiting the scope of the invention as defined in the accompanying claims. Unless otherwise indicated all parts and percentages in the examples are by weight, viscosity values were measured at 25° C. and the nitrogen used to remove oxygen from the catalyst and curable compositions contained less than one part per million of oxygen.

EXAMPLE 1

This example describes the preparation of a preferred platinum hydrosilation catalyst that is inhibited in the absence of oxygen.

1.0 g. of a conventional anaerobically active platinum-containing hydrosilation catalyst and 9.0 g. of dodecamethylpentasiloxane were placed in a vial equipped with a septum cap and stopcock. The contents of the vial were frozen at a temperature of 77° Kelvin, at which time a cycle of evacuating the vial to 0.5 Torr, warming the contents to room temperature and back filling with high purity (99.99%) argon was repeated for 30 minutes. 0.260 g. of methylphenylsilane was then added to the vial using a syringe, the resultant mixture was heated for 30 minutes at 75° C. while under an argon atmosphere and then allowed to cool to room temperature under the same atmosphere. The contents of the vial were then subjected to three cycles of freezing, evacuation and thawing followed by filling the vial with argon. The resultant catalyst will be referred to as "catalyst A".

The conventional platinum catalyst was a reaction product of hexachloroplatinic acid and sym-tetramethyldivinyldisiloxane that had been diluted with a liquid dimethylvinylsiloxy terminated polydimethylsiloxane with a viscosity of Pa.s in an amount sufficient to achieve a platinum content of weight percent.

80 ul of catalyst A was added to 50 g of a blend of 800 parts of a dimethylvinylsiloxy-terminated polydimethylsiloxane exhibiting a viscosity of 0.5 Pa.s and containing 0.45 weight percent vinyl radicals, and 20.8 parts of a trimethylsiloxy-terminated polydiorganosiloxane containing an average of five methylhydrogensiloxane units and three dimethylsiloxane units per molecule with a silicon-bonded hydrogen atom content in the range from about 0.7 to 0.8 weight percent. The blend had been sparged with argon for 1 hour prior to addition of the catalyst composition and was kept in a closed container. This blend will be referred to hereinafter as polymer blend A. The catalyzed composition contained 1 ppm of platinum and 23 ppm of the dodecamethylpentasiloxane, equivalent to a silane/Pt molar ratio of 50.

For comparative purposes the same amount of catalyst was added to 50 grams of polymer blend A that had not been sparged with argon.

The gel time of the composition that had been maintained under argon was 96 hours at 25° C. The comparative sample exposed to the air had a gel time less than 17 hours at the same temperature. Gel time is defined as the time required for the composition to crosslink to the extent that it no longer flows under its own weight.

EXAMPLE 2

This example demonstrates the beneficial effect of adding a conventional platinum catalyst inhibitor, 1-ethynyl-1-cyclohexanol, to a catalyst composition of the present invention.

1-Ethynyl-l-cyclohexanol was subjected to three cycles of freezing, evacuating and thawing while backfilling with argon. 10.4 microliters of this inhibitor were added to 50 grams of polymer blend A that had been sparged with argon for one hour, which is equivalent to an inhibitor concentration of 200 parts per million. The same volume of inhibitor was added to 50 grams of polymer blend A that had been in contact with air. Eighty microliters of catalyst A described in Example 1 were added each of the polymer blends, following which the containers were shaken and allowed to stand at 25° C. The gel time of the composition prepared entirely under argon was at least 72 days under these conditions. The polymer blend maintained in contact with air gelled in 31 days under the same conditions.

EXAMPLE 3

This example describes the preparation of curable compositions containing a second type of anaerobically stable catalyst of the present invention.

Ten grams of a known platinum catalyst for hydrosilation reactions and 10 g. of toluene were placed in a reactor equipped with a water cooled reflux condenser, thermometer, stirrer and addition funnel. Nitrogen that had been passed through copper powder heated at a temperature of 120° C. to reduce the molecular oxygen content below one part per million was bubbled (sparged) into the triethoxysilane in the addition funnel and through a syringe needle that extended through the septum and below the surface of the liquid in the reactor.

The known platinum catalyst was a reaction product of hexachloroplatinic acid and sym-tetramethyldivinyldisiloxane, and contained 4.212 weight percent of platinum.

Following 60 minutes of nitrogen sparging 10 g. (0.06 mole) of triethoxysilane were added slowly through the addition funnel. Samples were withdrawn from the reactor at approximately 20 minute intervals, diluted with a mixture of 0.5 g of toluene and 0.05 g. decane, and blended with about 0.005 g of N,N,N',N'-tetraethylenediamine to inactivate the platinum catalyst. The resultant samples were analyzed by gas liquid chromatography to determine the presence of triethoxysilane and 1,3-divinyltetramethyldisiloxane.

When about 5 g. of triethoxysilane had been added an exothermic reaction was observed. A sample withdrawn at this time contained 1,3-divinyltetramethyldisiloxane, but no detectable amount of triethoxysilane. Addition of approximately one cc portions of triethoxysilane was continued with analysis following each addition until the presence of unreacted silane was detected, an indication that the catalyst had been deactivated. A mixture containing equal weights of the silane and the disiloxane was sparged with nitrogen and added, and no additional reaction was detected after several days. A total of 6.15 parts of 1,3-divinyltetramethyldisiloxane and 24.5 parts of triethoxysilane had been added to the reactor, and the final anaerobically stable catalyst (catalyst B) contained 8316 parts of platinum metal per million parts of the catalyst composition.

A curable organosiloxane composition was prepared by adding one drop (about 0.005 g.) of catalyst B to 4.1 grams of a mixture (polymer blend B) prepared by blending 97.15 parts of a dimethylvinylsiloxy-terminated polydimethylsiloxane having a viscosity of about 0.4 Pa.s at 25° C., and 2.85 parts of a trimethylsiloxy-terminated polydiorganosiloxane having an average of five methylhydrogensiloxane units and three dimethylsiloxane units per molecule with a silicon-bonded hydrogen atom content in the range from about 0.7 to 0.8 weight percent. The molar ratio of silicon-bonded hydrogen atoms to vinyl radicals in polymer mixture B was 1.25.

For comparative purposes a curable composition was prepared using the procedure described in the two immediately preceding paragraphs but substituting for the catalyst 0.2 g. of a solution prepared from equal weight of dry toluene and the platinum catalyst used to prepare catalyst B. The solution was sparged with nitrogen for 60 minutes before being added to the other ingredients. The resultant composition cured in 2-3 minutes either when stored under nitrogen and or following exposure to air, demonstrating the absence of any anaerobic inhibition.

Prior to addition of the catalyst the polymer mixture had been sparged for 60 minutes with nitrogen that had been treated as described in the preceding section of this example. The resultant mixture cured, i.e. converted from a liquid to a gel, in 310 minutes when stored under nitrogen. When exposed to air under ambient conditions the mixture cured in 6 to 8 minutes.

To determine the effect of 3,5-dimethylhexyn-3-ol, a known platinum catalyst inhibitor, on the storage stability of the composition, 0.0134 g. of this inhibitor was added to 0.005 g. of catalyst B, equivalent to a molar ratio of inhibitor to platinum of 500. The resultant inhibitor/catalyst mixture was sparged with nitrogen for 60 minutes. 0.0184 g. of this mixture was added to 4.1 g. of polymer mixture B that had been sparged with and stored under nitrogen. The resultant curable composition remained liquid for more than 11 months when stored under nitrogen. When exposed to air under ambient conditions the composition cured in 10 hours.

A second inhibited catalyst sample was prepared using 0.0312 g. of the same inhibitor and 0.2596 g. of catalyst B, equivalent to a molar ratio of inhibitor to platinum of 21, and sparged with nitrogen. A curable composition prepared by blending 0.0053 g. of the inhibitor/catalyst mixture with 4.1 g. of polymer mixture B cured in 23 days when stored under nitrogen and in 13 hours following exposure to ambient air.

As a comparative example, the effect of the same inhibitor, 3,5-dimethylhexyn-3-ol, on the storage stability of a curable composition prepared in the absence of oxygen was determined using a conventional platinum hydrosilation catalyst. The inhibited catalyst composition was prepared by blending under nitrogen 0.0305 g. of 3,5-dimethyl-1-hexyn-3-ol with 0.2479 g. of a solution obtained by diluting 3.5 parts of the reaction product of hexachloroplatinic acid and sym-tetramethyldivinyldisiloxane (platinum content 4.212 weight percent) with 1 part of toluene. 0.0053 g. of the resultant inhibitor/catalyst mixture was added to 4.1 g. of polymer mixture B. One portion of the resultant curable composition was stored under nitrogen and a second was in contact with air. Both compositions cured in 9 hours.

The cure times of the curable ingredients and inhibited platinum catalyst described in the example were determined using two other known platinum catalyst inhibitors, N,N,N',N'-tetramethylethylenediamine (TMEDA), 3,5-dimethylhexyn-1-ol (DMH) and diethyl fumarate (DEF). The procedures used to prepare and evaluate the samples are the same ones described in the preceding section of this example. In each instance one drop, equivalent to about 0.005 g., of the inhibitor catalyst mixture was added to polymer blend B.

The molar ratio of inhibitor to platinum (Inh/Pt) and the cure times of the resultant compositions stored under nitrogen and exposed to air are listed in the following Table 1.

TABLE 1

| Inhibitor | Molar Ratio Inh/Pt | Cure Times Under $N_2$ | In Air |
|---|---|---|---|
| TMEDA | 1.3 | >11 months* | 7 hours |
| TMEDA | 1.0 | 5.5 days | 75 minutes |
| TMEDA | 0.7 | 4 days | 35 minutes |
| TMEDA | 0.26 | 8.5 hours | 20 minutes |
| DEF | 7.4 | 13 days | 8.5 hours |
| DMH | 498 | >11 months | 10 hours |

*Composition was liquid after 11 months of storage.

EXAMPLE 4

This example demonstrates the effect of oxygen scavengers on the storage stability of the anaerobically stable curable compositions of this invention.

Curable compositions were prepared and evaluated as described in Example 3, with the modification of adding the required amount of three known oxygen scavengers to catalyst B, and sparging the resultant scavenger/catalyst mixture with nitrogen. The scavengers were added to 4.1 g. of polymer blend B and the resultant curable composition was blended to homogeneity while sparging it with nitrogen.

The type of oxygen scavenger, molar ratio of oxygen scavenger to platinum (OS/Pt) and the cure times of the curable compositions under nitrogen and in air are listed in Table 2. The platinum concentration in each composition was 10 parts per million. The oxygen scavengers evaluated were carbohydrazide (CBHZ), trimethylacetaldehyde (TMA) and N-phenylglycine (NPG) as a 10 percent by weight solution in ethanol.

For the liquid oxygen scavengers 0.005 g of a mixture of the oxygen scavenger and catalyst were added. The weight ratios of catalyst to liquid oxygen scavenger were as follows: CBHZ=10 and TMA=12.8

N-phenylglycine was the only solid scavenger used, and was added as a 10 weight percent solution in ethanol, and was combined with 0.005 g. of the catalyst composition. The amounts of liquid oxygen scavengers and solutions of solid scavengers added are recorded in Table 2.

TABLE 2

| Oxygen Scavenger (g.) | Molar Ratio OS/Pt | Cure Times Under $N_2$ | In Air |
|---|---|---|---|
| CBHZ (0.1) | 5200 | 14.5 days | 28 hours |
| CBHZ (0.05) | 2600 | 12 days | 26 hours |
| CBHZ (0.01) | 520 | 12 days | 14 hours |
| TMA (0.042) | 2500 | 14 days | 32 hours |
| TMA (0.029) | 1700 | 14 days | 32 hours |
| NPG (0.15) | 318 | >6 months** | 30 days |
| NPG (0.075) | 237 | 3.5 months | 2 days |
| NPG (0.025) | 79 | 60 days | 38 hours |

**Composition was liquid following 6 months storage

EXAMPLE 5

This example demonstrates the efficacy of the anaerobically stable catalyst described in Example 3 using a different polymer composition. Curable compositions containing an anaerobically inactive catalyst were prepared and evaluated using the general procedure described in Example 3. The polymer blend, referred to as C, contained 92.5 parts of a dimethylvinylsiloxy-terminated dimethylsiloxane/methylvinylsiloxane copolymer containing 2 mole percent of methylvinylsiloxane units and exhibiting a viscosity of 0.3 Pa.s and 6.98 parts of a liquid trimethylsiloxy-terminated polymethylhydrogensiloxane with a silicon-bonded hydrogen content of about 1.6 weight percent. The molar ratio of silicon-bonded hydrogen atoms to vinyl radicals in this mixture was 3.

0.021 g. of the anaerobically stable catalyst described in Example 3 was added under a nitrogen atmosphere to 35 g. of polymer blend C and mixed well. When exposed to air under ambient conditions the composition cured in 10–12 minutes. The cure time of the same composition when maintained under nitrogen was about 8 hours.

EXAMPLE 6

This example demonstrates the storage stability imparted to curable compositions by an anaerobically stable catalyst of this invention.

The catalyst was prepared by combining 10 g. of 1-hexene with 10 g. of a reaction product of hexachloroplatinic acid and sym-tetramethyldivinyldisiloxane containing 4.212 weight percent of platinum. The resultant mixture was sparged with nitrogen for 60 minutes, at which time a mixture containing 70 weight percent of triethoxysilane and the remainder unreactive condensation products of this silane, referred to hereinafter as the silane mixture, was added gradually to the reaction vessel. An exothermic reaction was observed after 10 grams of the silane mixture had been added. Analysis of the reaction mixture did not reveal the presence of unreacted triethoxysilane. An additional 7 g. of the silane mixture was added, at which time unreacted triethoxysilane was detected in the reaction mixture. A mixture of 3 g. of 1-hexene and 4 g. of the silane mixture was then added, for a total of 21 g. of the silane mixture and 18 g. of 1-hexene. This catalyst mixture, referred to hereinafter as catalyst C contained 8596 parts per million of platinum.

One drop (approximately 0.0044 g.) of catalyst C was added to 3.8 g. of polymer blend B described in Example 3 and mixed well. The polymer blend and the catalyst had been prepared and stored under nitrogen. The curable composition cured in about 430 minutes when stored under nitrogen and in 10–13 minutes following exposure to air under ambient conditions.

For comparative purposes a curable composition was prepared as described in the first part of this example using 3.9 g. of polymer blend B and replacing the platinum catalyst with 0.20 g. of a solution obtained by diluting the reaction product of hexachloroplatinic acid and sym-tetramethyldivinyldisiloxane (platinum content 4.212 weight percent) with an equal weight of toluene. The resultant composition cured in 2–3 minutes either when stored under nitrogen or following exposure of the freshly prepared composition to air under ambient conditions.

When one drop of catalyst C was added to 3.8 g. of polymer blend C described in Example 5 under nitrogen the resultant composition cured in about 300 minutes under nitrogen and in 13–15 minutes following exposure of the freshly prepared composition to air under ambient conditions. A comparative sample prepared by combining 3.9 g. of polymer blend C with 0.20 g. of a solution obtained by diluting the reaction product of hexachloroplatinic acid and sym-tetramethyldivinyldisiloxane (platinum content 4.212 weight percent) with an equal weight of toluene cured in 2 minutes either when stored under nitrogen or following exposure of the freshly prepared composition to air under ambient conditions.

EXAMPLE 7

This example describes the preparation and evaluation of curable compositions wherein known anaerobically active hydrosilation catalysts are reacted with a number of organosilicon compounds containing silicon-bonded hydrogen atoms. The example demonstrates the effect of these organosilicon compounds on the storage stability of the curable composition.

The catalysts were prepared, stored and evaluated in an air-tight chamber under an atmosphere of nitrogen containing less than 0.3 ppm of oxygen. The temperature in the chamber was 25° C.

The quantity of organosilicon compound listed in Table 3 was gradually added to the platinum compound, at which time a color change was observed. After remaining undisturbed for 5 minutes the resultant deactivated catalyst was added to 77.72 parts of a dimethylvinylsiloxy-terminated polydimethylsiloxane having a viscosity of about 0.4 Pa.s at 25° C. This mixture was aged for about ten minutes, at which time 2.28 parts of a trimethylsiloxy-terminated polyorganosiloxane having an average of five methylhydrogensiloxane units and three dimethylsiloxane units per molecule with a silicon-bonded hydrogen atom content in the range from about 0.7 to 0.8 weight percent was added. This polyorganosiloxane was used as the reactant for the anaerobically active catalyst in one instance. The resultant composition of this invention was mixed well and divided into several portions. One of these was sealed and kept in the chamber in which it was prepared and the time required for the composition to cure was determined. Other samples were exposed to air under ambient conditions and the cure time determined.

The anaerobically active hydrosilation catalysts were:

1. hexachloroplatinic acid ($H_2PtCl_6$)
2. platinum dichloride ($PtCl_2$)
3. platinum tetrachloride ($PtCl_4$)
4. a reaction product of hexachloroplatinic acid and sym-tetramethyldivinyldisiloxane that has been diluted to a platinum content of 0.7 weight percent using a liquid dimethylvinylsiloxy terminated polydimethylsiloxane (referred to as catalyst A′)
5. Platinum acetylacetonate $Pk(AcAc)_2$
6. Norbornadiene complex with platinum(II) chloride ($PtCl_2.NOBD$)

TABLE 3

| Pt Compound | SiH Compound | Cure Time in Air | Storage Stability Under Nitrogen |
|---|---|---|---|
| $H_2PtCl_6$ | $(EtO)_3SiH$ | 3.5 Hrs. | 3 Days |
| $H_2PtCl_6$ | $Me(MeO)_2SiH$ | 3.0 Hrs. | 10 Hrs. |
| $H_2PtCl_6$ | $(Me_2HSi)_2O$ | 3.5 Hrs. | 10 Hrs. |
| $H_2PtCl_6$ | Curing Agent[1] | 15 Hrs. | 12 Days |
| $PtCl_2$ | $(EtO)_3SiH$ | 55 Min. | 15 Hrs. |
| $PtCl_2$ | $Me(MeO)_2SiH$ | 70 Min. | 17.5 Hrs. |
| $PtCl_4$ | $(EtO)_3SiH$ | 2 Hrs. | 12 Hrs. |
| $PtCl_4$ | $Me(MeO)_2SiH$ | 100 Min | 5.5 Hrs |
| A′ | $n-HexSiH_3$ | 3.5 Hrs. | 3 Days |
| A′ | $Et_2SiH_2$ | 4 Hrs. | 17 Hrs. |
| A′ | $Et_3SiH$ | 55 Min. | 9 Hrs. |
| A′ | $Me(OMe)_2SiH$ | 15 Min. | 90 Min. |
| A′ | $(Me_2HSiO)_4Si$[2] | N.E. | N.E. |
| $Pt(AcAc)_2$[3] | $Me(OMe)_2SiH$ | 15 Hrs. | 4.5 Days |
| $PtCl_2.NOBD$ | $Et_2SiH_2$ | 5.5 Hrs. | 1 Day |
| $PtCl_2.NOBD$ | $n-HexSiH_3$ | 9.5 Hrs. | 3.5 Days |

Me = Methyl
Et = Ethyl
n-Hex = n-hexyl
[1]The organohydrogenpolysiloxane ingredient of the curable composition.
[2]Comparative Example. Platinum is in the zero valent state. Addition of SiH compound to catalyst resulted in solidification. Catalyst could not be evaluated (N.E. = not evaluated).
[3]Platinum bis-acetylacetonate That which is claimed is 1. Curable compositions exhibiting cure inhibition in the absence of oxygen, said composition comprising
    A. a first compound containing at least two ethylenically unsaturated or acetylenically unsaturated groups per molecule;
    B. an amount sufficient to cure said composition in the presence of an active hydrosilation catalyst of a second compound containing at least two silicon-bonded hydrogen atoms per molecule; and
    C. an amount sufficient to promote curing of said composition in the presence of oxygen of an anaerobically inhibited hydrosilation catalyst containing a platinum group metal.

2. A composition according to claim 1 where said anaerobically inhibited catalyst is a reaction product of
    (1) an anaerobically active hydrosilation catalyst selected from the group consisting of platinum group metals and compounds thereof with
    (2) at least one organosilicon compound selected from the group consisting of organohydrogensilanes containing up to three silicon-bonded hydrogen atoms per molecule, organohydrogendisiloxanes, organohydrogenpolysilanes and organohydrogenpolysiloxanes, the concentration of said organosilicon compound is sufficient to inhibit the activity of said catalyst in the absence of oxygen, and the substituents other than hydrogen atoms bonded to the silicon atom of said organosilicon compounds are selected from the group consisting of monovalent hydrocarbon radicals, alkoxy groups and siloxane units, with the proviso that when said platinum group metal is in the zero valence state and none of the silicon atoms of said organosilicon compound are bonded to more than one silicon-bonded hydrogen atom, the hydrogen-substituted silicon atoms of the organosilicon compound are represented by the formula

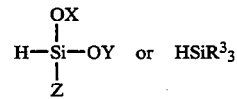

where X and Y are individually selected from alkyl or $SiR^4_3$, Z is alkyl, alkoxy or $OSiR^4_3$, $R^3$ is alkyl and each R⁴ is individually selected from the group consisting of hydrogen atoms, unsubstituted and substituted hydrocarbon radicals, alkoxy groups and organosiloxane groups, with the proviso that when Z is alkyl, X and Y cannot both be $SIR^4_3$.

3. A composition according to claim 2 where said anaerobically active catalyst is selected from the group consisting of platinum, rhodium, and compounds of platinum and rhodium, and said organosilicon compound is selected from the group consisting of compounds of the formulae $R^1{}_b(OR^2)_{4-a-b}SiH_a$ and $(SiR^1{}_2H)_2O$ and organohydrogenpolysiloxanes comprising units of the formula $H_cR^1{}_d(OR^2)_eSiO_{(4-c-d-e)/2}$, where $R^1$ is a monovalent hydrocarbon selected from hydrocarbon 3,3,3-trifluoropropyl radical that is free of ethylenic or acetylenic unsaturation, $R^2$ is alkyl containing from 1 to 4 carbon atoms, a is 1, 2 or 3; b is 0, 1, 2 or 3; and the sum of a and b does not exceed 4; c is 1, 2 or 3, and d and e are each 0, 1 or 2, with the proviso that the sum of c, d, and e is 1, 2 or 3, and when more than one $R^1$ or $R^2$ substituent is present these substituents are identical or different.

4. A composition according to claim 3 where said anaerobically active catalyst is selected from the group consisting of platinum halides and coordination complexes derived from a halogen-containing platinum compound and an organosilicon compound containing at least one alkenyl or alkynyl radical per molecule, $R^1$ is alkyl containing from 1 to 4 carbon atoms, phenyl or 3,3,3-trifluoropropyl, and $R^2$ is methyl or ethyl.

5. A composition according to claim 4 where said anaerobically active catalyst is a coordination complex derived from a halogen-containing platinum compound and a reactant selected from the group consisting of terminally unsaturated hydrocarbons containing from 6 to 10 carbon atoms, alkenyl-substituted silanes and sym-tetraalkyldialkenyldisiloxanes, where the alkenyl radical contains from 2 to 8 carbon atoms.

6. A composition according to claim 5 where said reactant is a vinyl-substituted silane or a tetraalkyldivinyldisiloxane.

7. A composition according to claim 3 where said organosilicon compound is selected from the group consisting of ethylsilane, n-hexylsilane, diethylsilane, triethylsilane, methylphenylsilane, methyldimethoxysilane, trimethoxysilane, and triethoxysilane, the platinum in said anaerobically inhibited hydrosilation catalyst constitutes from 0.1 to 1 percent of the total weight of said catalyst, and platinum constitutes from 10 to 125 parts by weight per million parts of said composition.

8. A composition according to claim 2 where the anaerobically inhibited hydrosilation catalyst is prepared, isolated and stored under anaerobic conditions and the platinum group metal constitutes from 0.01 to 1 weight percent of said anaerobically inhibited hydrosilation catalyst.

9. A composition according to claim 2 where said composition contains an inhibitor for platinum group metal-containing hydrosilation catalysts, where said inhibitor is active both in the presence and absence of oxygen.

10. A composition according to claim 9 where said inhibitor is selected from the group consisting of acetylenic hydrocarbons and alcohols, tertiary amines and esters of maleic and fumaric acid.

11. A composition according to claim 9 where said inhibitor is deactivated in the presence of molecular oxygen.

12. A composition according to claim 11 where the oxygen-deactivated inhibitor is selected from the group consisting of
 (1) organophosphorus compounds selected from the group consisting of phosphine oxides, phosphines, phosphites, phosphinites, phospholene oxides, and bis(dihydrocarbylphosphino)alkanes;
 (2) amine N-oxides, and
 (3) sulfoxides, where the organic groups present on said organophosphorus compounds, amine oxides and sulfoxides are monovalent hydrocarbon radicals, and the molar ratio of said inhibitor to platinum group metal present in said catalyst is from 2 to 200.

13. A composition according to claim 1 where said first compound is selected from the group consisting of organic polymers and polyorganosiloxanes containing at least two alkenyl radicals per molecule, said second compound is selected from the group consisting of organic polymers and organohydrogenpolysiloxanes wherein the organic groups bonded to the silicon atoms of said second compound are monovalent substituted or unsubstituted hydrocarbon radicals that are free of ethylenic unsaturation, the sum of the average number of alkenyl radicals present per molecule of said first compound and the average number of silicon-bonded hydrogen atoms present per molecule of said second compound is greater than 4.

14. A composition according to claim 13 where said first compound is an alkenyl-substituted polyorganosiloxane, said second compound is an organohydrogenpolysiloxane, the silicon-bonded organic groups of said polyorganosiloxane and said organohydrogensiloxane are selected from the group consisting of unsubstituted and halogenated monovalent hydrocarbon radicals, 15. A composition according to claim 14 where at least 50 percent of the hydrocarbon radicals present on said first and second compounds are methyl.

16. A composition according to claim 2 where said composition contains at least one additive selected from the group consisting of oxygen scavengers, catalysts for said oxygen scavengers, adhesion promoters, stabilizers, aerobically active and aerobically inactive hydrosilation catalyst inhibitors, flame retardants, reinforcing and non-reinforcing fillers and treating agents for said fillers.

17. A composition according to claim 4 where said composition is stored in at least two containers with the catalyst located in a different container relative to at least one of said first compound and said second compound.

18. A composition according to claim 2 where said composition is stable for at least on day at 25° C. in the absence of oxygen.

19. A method for preparing an anaerobically stable organosiloxane composition that cures in the presence of molecular oxygen and is at least partially inhibited from curing in the absence of oxygen, said method comprising the sequential steps of
 1) blending in the absence of oxygen
  A. a first compound containing at least two ethylenically or acetylenically unsaturated groups per molecule;
  B. an amount sufficient to cure said composition in the presence of an active hydrosilation catalyst of a second compound containing at least two silicon-bonded hydrogen atoms per molecule, and C. an amount sufficient to promote curing of said composition in the presence of oxygen of an anaerobically inhibited hydrosilation catalyst containing a platinum group metal, and 2) storing the resultant composition in the absence of molecular oxygen.

20. A method according to claim 19 where said anaerobically inhibited catalyst is a reaction product of
(1) an anaerobically active hydrosilation catalyst selected from the group consisting of platinum group metals and compounds thereof with
(2) at least one organosilicon compound selected from the group consisting of organohydrogensilanes containing up to three silicon-bonded hydrogen atoms per molecule, organohydrogendisiloxanes and organohydrogenpolysiloxanes, the concentration of said organosilicon compound is sufficient to inhibit the activity of said catalyst in the absence of oxygen, with the proviso that when said platinum group metal is in the zero valence state and none of the silicon atoms of said organosilicon compound are bonded to more than one hydrogen atom, the hydrogen-substituted silicon atoms of the organosilicon compound are represented by the formula

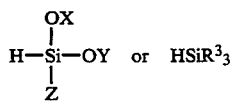

where X and Y are individually selected from alkyl or $SiR^4{}_3$, Z is alkyl, alkoxy or $OSiR^4{}_3$, $R^3$ is alkyl and each $R^4$ is individually selected from the group consisting of hydrogen atoms, unsubstituted and substituted hydrocarbon radicals, alkoxy groups and organosiloxane groups, with the proviso that when Z is alkyl, X and Y cannot both be $SiR^4{}_3$.

21. A method according to claim 20 where said anaerobically active catalyst is selected from the group consisting of platinum, rhodium and compounds of platinum and rhodium, and said organosilicon compound is selected from the group consisting of compounds of the formulae $R^1{}_b(OR^2)_{4-a-b}SiH_a$ and $(SiR^1{}_2H)_2O$ and organohydrogenpolysiloxanes comprising units of the formula $H_cR^1{}_d(OR^2)_eSiO_{(4-c-d-e)/2}$, where $R^1$ is a monovalent selected from hydrocarbon 3,3,3-trifluoropropyl radical that is free of ethylenic or acetylenic unsaturation, $R^2$ is alkyl containing from 1 to 4 carbon atoms, a is 1, 2 or 3; b is 0, 1, 2 or 3; and the sum of a and b does not exceed 4; c is 1, 2 or 3, and d and e are each 0, 1 or 2, with the proviso that the sum of c, d, and e is 1, 2 or 3, and when more than one $R^1$ or $R^2$ substituent is present these substituents are identical or different.

22. A method according to claim 21 where said anaerobically active catalyst is selected from the group consisting of halogen-containing platinum compounds and coordination complexes derived from said halogen-containing platinum compounds and an organosilicon compound containing at least one alkenyl or alkynyl radical per molecule, $R^1$ is alkyl containing from 1 to 4 carbon atoms, phenyl or 3,3,3-trifluoropropyl, and $R^2$ is methyl or ethyl.

23. A method according to claim 22 where said anaerobically active catalyst is a coordination complex derived from a halogen-containing platinum compound and a reactant selected from the group consisting of terminally unsaturated hydrocarbons containing from 6 to 10 carbon atoms, alkenyl-substituted silanes and sym-tetraalkyldialkenyldisiloxanes, where the alkenyl radical contains from 2 to 8 carbon atoms.

24. A method according to claim 23 where said reactant is a vinyl-substituted silane or a tetraalkyldivinyldisiloxane.

25. A method according to claim 24 where said organohydrogensilane is selected from the group consisting of ethylsilane, n-hexylsilane, diethylsilane, triethylsilane, methylphenylsilane, methyldimethoxysilane, trimethoxysilane, and triethoxysilane, the platinum in said anaerobically inhibited hydrosilation catalyst constitutes from 0.01 to 1 percent of the total weight of said catalyst, and the concentration of platinum is from 10 to 125 parts by weight per million parts of said composition.

26. A method according to claim 25 where said composition contains an inhibitor for platinum group metal-containing hydrosilation catalysts, where said inhibitor is active both in the presence and absence of oxygen.

27. A method according to claim 25 where said inhibitor is selected from the group consisting of acetylenic hydrocarbons and alcohols, tertiary amines and esters of maleic and fumaric acid.

28. A method according to claim 26 where said inhibitor is deactivated in the presence of molecular oxygen.

29. A method according to claim 28 where the oxygen-deactivated inhibitor is selected from the group consisting of
(1) organophosphorus compounds selected from the group consisting of phosphine oxides, phosphines, phosphites, phosphinites, phospholene oxides, and bis(dihydrocarbylphosphino)alkanes;
(2) amine N-oxides, and
(3) sulfoxides, where the organic groups present on said organophosphorus compounds, amine oxides and sulfoxides are monovalent hydrocarbon radicals, the molar ratio of said inhibitor to platinum group metal present in said catalyst is from 2 to 200.

30. A method according to claim 19 where said first compound is selected from the group consisting of organic polymers and polyorganosiloxanes containing at least two alkenyl radicals per molecule, said second compound is selected from the group consisting of organic polymers containing at least two groups of the formula -SiY$_2$H per molecule, where Y represents a monovalent hydrocarbon radical or an alkoxy group, and organohydrogenpolysiloxanes wherein the organic groups bonded to the silicon atoms of said organohydrogenpolysiloxanes are monovalent substituted or unsubstituted hydrocarbon radicals that are free of ethylenic unsaturation, the sum of the average number of alkenyl radicals present per molecule of said first compound and the average number of silicon-bonded hydrogen atoms present per molecule of said second compound is greater than 4.

31. A method according to claim 30 where said first compound is an alkenyl-substituted polyorganosiloxane, said second compound is an organohydrogensiloxane, the silicon-bonded organic groups of said polyorganosiloxane and said organohydrogensiloxane are selected from the group consisting of unsubstituted and halogenated monovalent hydrocarbon radicals, 32. A method according to claim 31 where at least 50 percent of the hydrocarbon radicals present on said first and second compounds are methyl.

33. A method according to claim 20 where said composition contains at least one additive selected from the group consisting of oxygen scavengers, catalysts for said oxygen scavengers, adhesion promoters, stabilizers, hydrosilation catalyst inhibitors, flame retardants, reinforcing and non-reinforcing fillers and treating agents for said fillers.

34. A method according to claim 20 where said composition is cured by exposing it to a source of oxygen selected from the group consisting of gases consisting at least partially of oxygen and compounds generating oxygen as a decomposition product.

35. A method according to claim 34 where said compounds are organic peroxides and the oxygen-containing gas is air or molecular oxygen.

36. A method according to claim 19 where said composition is stored in at least one hermetically sealed container.

37. A method according to claim 36 where said composition is stored in at least two containers, with the anaerobically inactive hydrosilation catalyst being separated from at least one of said first compound and said second compound.

* * * * *